United States Patent
Hoffman et al.

(10) Patent No.: US 9,309,697 B2
(45) Date of Patent: Apr. 12, 2016

(54) ACCESSORY HOUSING SECURABLE TO A DEVICE AND ANOTHER ENTITY

(75) Inventors: Dustin L Hoffman, Cypress, TX (US); Michael Delpier, Houston, TX (US); Peter M On, Austin, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 186 days.

(21) Appl. No.: 14/235,790

(22) PCT Filed: Aug. 2, 2011

(86) PCT No.: PCT/US2011/046180
§ 371 (c)(1),
(2), (4) Date: Jan. 28, 2014

(87) PCT Pub. No.: WO2013/019211
PCT Pub. Date: Feb. 7, 2013

(65) Prior Publication Data
US 2014/0192466 A1    Jul. 10, 2014

(51) Int. Cl.
*G06F 1/16*    (2006.01)
*E05B 69/00*    (2006.01)
*G08B 13/12*    (2006.01)
*E05B 73/00*    (2006.01)
*G06F 21/88*    (2013.01)
*H05K 5/02*    (2006.01)

(52) U.S. Cl.
CPC .......... *E05B 73/0082* (2013.01); *G06F 21/88* (2013.01); *G08B 13/126* (2013.01); *H05K 5/0208* (2013.01)

(58) Field of Classification Search
CPC .... E05B 73/0082; H05K 5/0208; G06F 21/88
USPC .......... 361/679.57, 679.01–679.45, 361/679.55–679.59; 70/58; 340/568.2
See application file for complete search history.

(56) References Cited

U.S. PATENT DOCUMENTS

| 4,212,175 A | 7/1980 | Zakow | |
| 4,733,840 A * | 3/1988 | D'Amore | E05B 73/0005 248/205.3 |
| 5,568,359 A | 10/1996 | Cavello et al. | |

(Continued)

FOREIGN PATENT DOCUMENTS

| CN | 2387576 | 7/2000 |
| CN | 201125602 | 10/2008 |

(Continued)

OTHER PUBLICATIONS

"CI-75 Deli High Security Custom Computer Lock", < http://www.laptoplocks.com/index.php/custom-computer-locks/dell-high-security-custom-co >, retrieved Jan. 27, 2014.

(Continued)

*Primary Examiner* — Nidhi Thaker
(74) *Attorney, Agent, or Firm* — HP Inc Patent Department (57) ABSTRACT

Apparatus and methods related to securing portable devices and their accessories are provided. A housing for an accessory includes a passageway extending at least partially there through. A first feature extending outward from the passageway is removably securable to a portable device. A second feature extending outward from the passageway is removably securable to another entity. The accessory and the portable device are thus securable against theft.

11 Claims, 5 Drawing Sheets

(56) References Cited

U.S. PATENT DOCUMENTS

| | | | |
|---|---|---|---|
| 5,675,998 A | | 10/1997 | Monteiro |
| 5,787,738 A | | 8/1998 | Brandt et al. |
| 6,047,572 A | | 4/2000 | Bliven et al. |
| 6,971,255 B2 | * | 12/2005 | Bhogal ............... E05B 73/0005 361/679.55 |
| 7,013,685 B2 | * | 3/2006 | Francke ................ E05B 67/006 70/18 |
| 7,710,714 B2 | * | 5/2010 | Rapp .................... G01G 21/283 177/182 |
| 2005/0157460 A1 | | 7/2005 | Bhogal et al. |
| 2005/0231899 A1 | | 10/2005 | Barnes et al. |
| 2010/0071423 A1 | * | 3/2010 | Dehaan ............... E05B 73/0005 70/58 |
| 2012/0262860 A1 | * | 10/2012 | Seibert ................ H05K 5/0217 361/679.02 |
| 2013/0265164 A1 | * | 10/2013 | Brown .................. G08B 13/14 340/568.2 |

FOREIGN PATENT DOCUMENTS

| | | | | |
|---|---|---|---|---|
| IL | WO 03076744 A1 | * | 9/2003 | .......... E05B 73/0082 |
| TN | FR 2952455 A1 | * | 5/2011 | .............. G06F 21/86 |
| WO | WO 2015065466 A1 | * | 5/2015 | ......... H01R 13/6273 |

OTHER PUBLICATIONS

"Kensington Twin Microsaver", < http://www.securitykit.com/kensington-microsaver30025.htm >, 2011.
"Microsaver Retractable Lock", < http://www.securitykit.com/Micro-RetractLock.html >, 2011.
"World's Smallest Laptop lock—CL14T-XTrap", < http://www.maclocks.com/index.php/mac-mini-locks/ultra-compact-and-trap-laptop-lock-50 >, 2011.
International Search Report and Written Opinion received in PCT Application No. PCT/US2011/046180, mailed on Feb. 27, 2012, 9 pgs.

* cited by examiner

ACCESSORY HOUSING SECURABLE TO A DEVICE AND ANOTHER ENTITY

BACKGROUND

Portable computers such as laptops and tablets are popular and are used in a variety of settings. Anti-theft security is a significant concern to users, especially in a public location where the device might be left briefly unattended. This same concern extends to the power supply or other accessories that are being used with the device. The present teachings address the foregoing and related concerns.

BRIEF DESCRIPTION OF THE DRAWINGS

The present embodiments will now be described, by way of example, with reference to the accompanying drawings, in which.

DETAILED DESCRIPTION

Introduction

Apparatus and methods related to securing portable devices and their accessories are provided. A housing for an accessory includes a passageway extending at least partially there through. A first feature extending outward from the passageway by way of a flexible strand is removably securable to a portable device. A second feature extending outward from the passageway by way of a flexible strand is removably securable to another entity. The accessory and the portable device are thus securable against theft.

In one example, a device includes an accessory housing characterized by a passageway having an interior wall surface. The device also includes a flexible strand disposed at least in part within the passageway. The flexible strand includes a first end to be removably secured to a portable device and a second end to be removably secured to an entity.

In another example, a power supply for a portable computer includes a locking mechanism to be removably secured to a corresponding feature of a portable computer. The power supply also includes a flexible strand having an anchor end to be removably secured to an entity.

In yet another example, a power supply includes electrical circuitry configured to derive conditioned electrical energy from a source of electrical energy. The power supply also includes cabling to provide the conditioned electrical energy to an electrical load. The power supply additionally includes a housing about the electrical circuitry. The housing is characterized by a passageway that extends at least partially there through and having an interior wall surface. The power supply also includes a first feature extending outward from the passageway. The first feature is configured to be removably secured to the electrical load. The power supply further includes a second feature extending outward from the passageway. The second feature is configured to be removably secured to an entity.

Illustrative System

Figure 1:
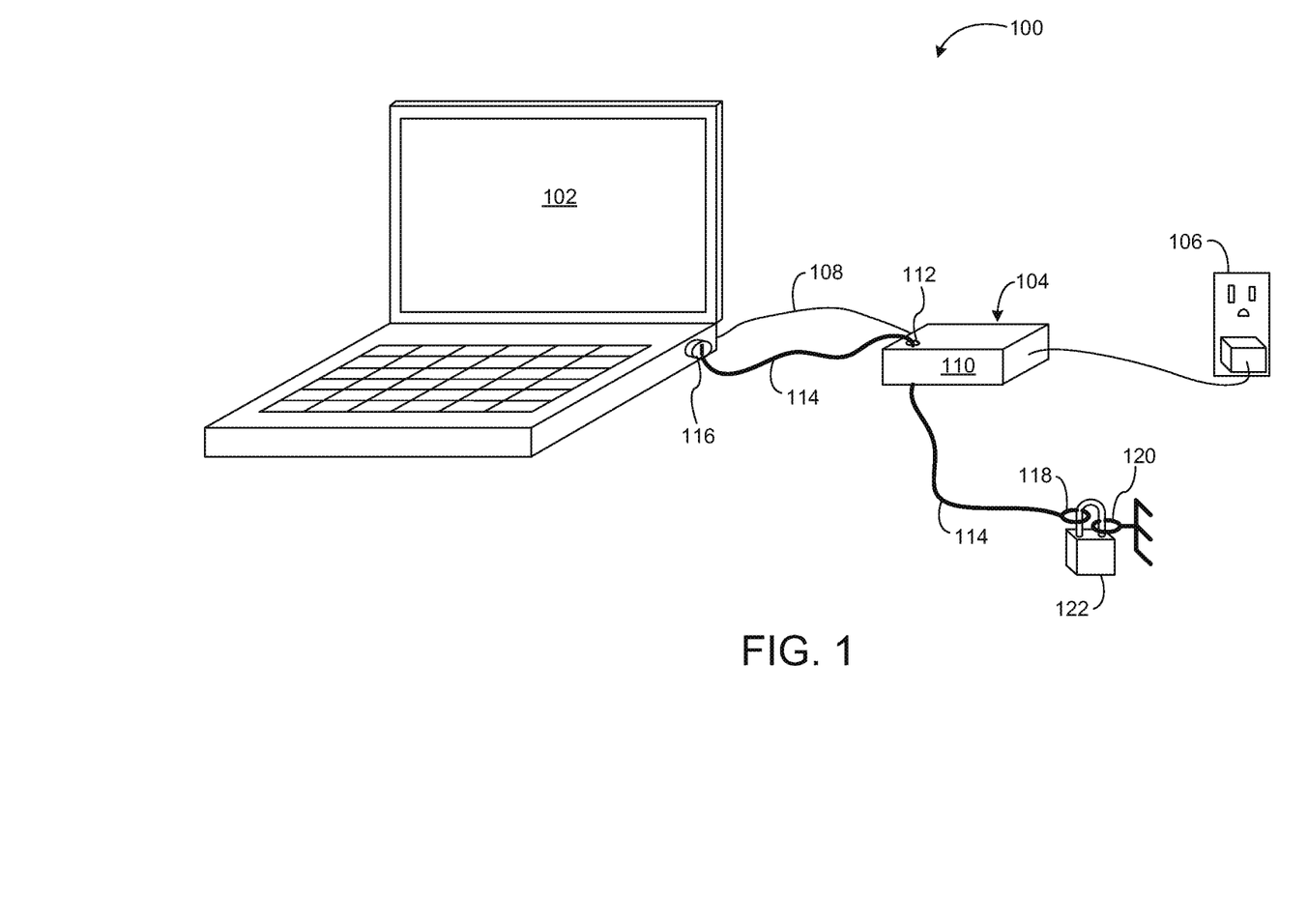
FIG. 1 depicts a system according to one example of the present teachings.

Reference is now directed to FIG. 1, which depicts a system 100 according to an example of the present teachings. The system 100 is illustrative and non-limiting in nature. Thus, other devices, apparatus and systems are contemplated by the present teachings. The system 100 is also referred to as a security system 100 for purposes herein.

The system 100 includes a portable computer (computer) 102. Specifically, the portable computer 102 has a laptop configuration. The computer 102 can be defined by any suitable portable computing device such as a tablet or other form-factor. The computer 102 is known to one of ordinary skill in the computing arts, and further elaboration is not needed tor purposes of understanding the present teachings.

The system 100 also includes a power supply 104 in accordance with the present teachings. The power supply 104 is configured to be electrically coupled to a source 106 of electrical energy (i.e., utility power) and to provide conditioned electrical energy to the computer 102 by way of suitable cabling 108. Such electrical conditioning as performed by the power supply 104 can include, without limitation, rectification, voltage regulation, current limiting, over-current protection, electrical noise or ripple filtering, and so on. The power supply 104 can perform other suitable electrical functions as well.

The power supply 104 includes a housing 110 characterized by or defining a passageway 112 there through. Specifically, the passageway 112 extends through the housing 110 and is defined by an interior wall surface such that a conduit or tunnel is defined, being open on opposite ends. The housing 110, including the tunnel-like passageway 112, defines a hermetically sealed cavity within. Electrical or electronic components, devices and circuitry germane to the power supply 104 are protected against ambient contaminants within the housing 110.

The system 100 also includes a flexible strand 114. The flexible strand 114 can be defined by a steel or metallic cable, a steel or metallic chain, or another suitable construct. For purposes of one example, the flexible strand 114 is defined by vinyl-coated steel cable and is referred to as a steel cable 114.

The steel cable 114 includes a first end 116. The first end 116 is configured to be removably secured (i.e., locked and unlocked) to the portable computer 102 by way of a key-activated locking mechanism. In one example, the first end 116 is defined by or compatible with a "Kensington" style lock available from ACCO Brands Corporation, Lincolnshire, Ill., USA. Engagement is performed by way of a corresponding feature of the portable computer 102 that is compatible with the first end 116. Other types or form-factors of first end 116 can also be used. The first end 116 is referred to as a locking end 116 hereinafter.

The steel cable 114 also includes second end 118. The second end 118 is configured to be removably secured to fixed or relatively heavy entity such as a table leg, security loop or ring, and so on. The second end 118 includes or is defined by a closed loop. Other types or form-factors of second end 118 can also be used. In one example, the second end 118 is removably secured to a fixed security ring 120 by way of a padlock 122. The second end 118 is referred to as an anchor end 118 hereinafter.

The flexible strand 114 (i.e., steel cable 114) is routed through the passageway 112 of the power supply 104. In turn, the locking end 116 is secured to the portable computer 102 and the anchor end 118 is secured to the fixed security ring 120. In this way, both the portable computer 102 and the power supply 104 are secured against theft by way of the flexible strand 114. Thus, a single flexible strand 114 having locking end 116 and anchor end 118 is used to secure two distinct entities of the system 100. The portable computer 102 and the power supply 104 are mechanically coupled in a "daisy-chain" configuration by way of the flexible strand 114.

Illustrative Power Supply

Figure 2:
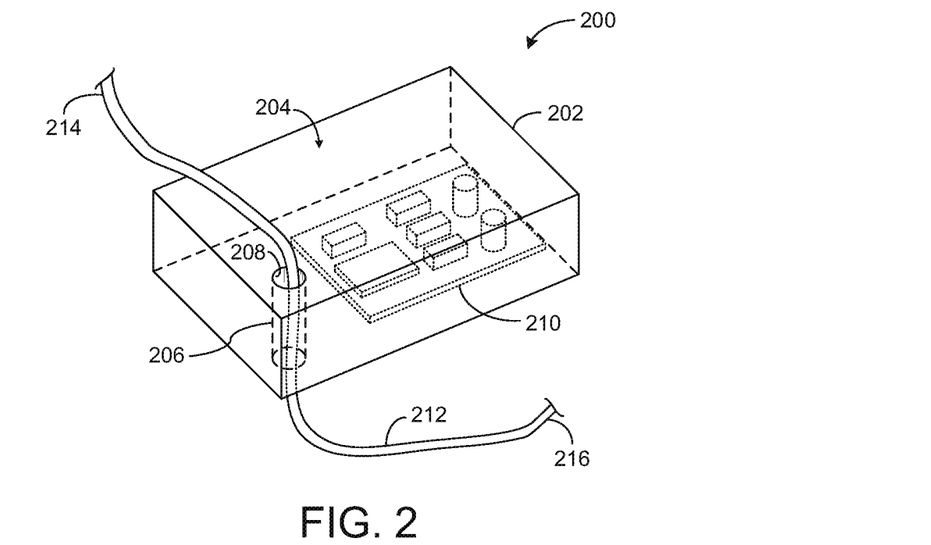
FIG. 2 depicts an isometric view of a power supply according to another example.

Reference is now directed to FIG. 2, which depicts a power supply 200. The power supply 200 is illustrative and non-limiting in nature. Thus, other power supplies, apparatus and systems are contemplated by the present teachings.

The power supply 200 includes a housing 202. The housing 202 can be formed from plastic, metal, or other suitable material or materials. In turn, the housing 202 can be formed by way of injection molding, sheet metal processing, casting, and so on. The housing 202 can be defined by any number of discrete pieces that are assembled so as to define a unitary structure. The housing 202 defines an internal cavity 204 that is hermetically sealed against outside elements and contaminants when the housing 202 is fully assembled.

The housing 202 defines or is characterized by a passageway 206. The passageway 206 extends through the housing 202 and is defined by a closed interior wall 208. The passageway 206 is therefore in the form of a closed conduit that is open on opposite ends. The interior wall 208 of the passageway 206 is a factor in the hermetically sealed nature of the internal cavity 204.

The power supply 200 includes electronic circuitry 210 disposed within the internal cavity 204. The electronic circuitry 210 is configured to receive electrical energy from a source such as, for non-limiting example, utility power, and to derive conditioned electrical energy there from. Such conditioning can include voltage transformation, rectification, voltage regulation, current limiting, and so on. Other electrical conditioning can also be performed by the electronic circuitry 210. The electronic circuitry 210 can be defined by any suitable componentry or circuit arrangement. The particular constituency or configuration of the electronic circuitry 210 is not germane to the present teachings.

A flexible strand 212 is routed through the passageway 206 of the power supply 200. The flexible strand 212 can be defined by a metallic cable or chain or another suitable entity. The flexible strand 212 includes a first portion 214 that can lead, for non-limiting example, to a locking mechanism, a closed loop, and so on, configured to be removably secured to a portable computer.

The flexible strand 212 also includes a second portion 216 that can terminate, for non-limiting example, with an anchor end (e.g., 118), a locking mechanism, a closed loop, and so on, configured to be removably secured to fixed object or anchoring entity. The flexible strand 212 is therefore used to secure the power supply 200 against theft during typical, normal use according to the present teachings.

First Illustrative Housing

Figure 3:
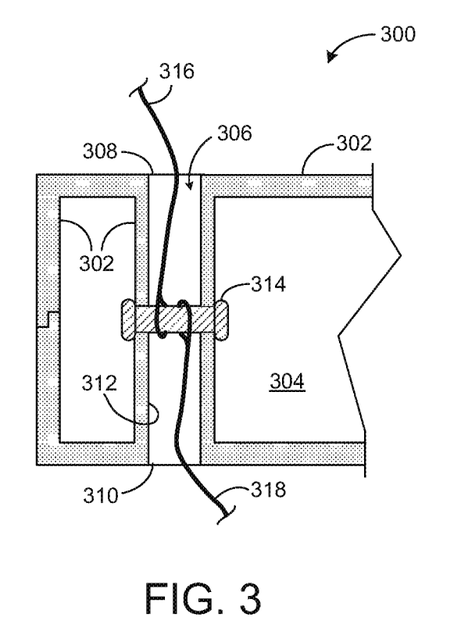
FIG. 3 depicts a sectional view of a housing according to yet another example.

Attention is now turned to FIG. 3, which depicts a sectional view of a portion of a housing 300. The housing 300 can enclose any suitable electrical, electronic or mechanical constituency. In one example, the housing 300 includes components and circuitry defining a power supply for a portable computer. Other accessories or peripherals including the housing 300 can also be defined. The housing 300 is illustrative and non-limiting with respect to the present teachings.

The housing 300 is formed from a solid material 302 such as plastic, metal and so on such that an interior cavity 304 is defined. The housing 300 is characterized by a passageway 306 that extends through the housing 300 from a first opening 308 to a second opening 310. The passageway 306 is characterized by an interior wall 312 formed of the solid material 302 such that a channel or conduit is defined.

The housing 300 also includes pin 314. The pin 314 is formed from metal such as steel, or another suitable material. The pin 314 spans diametrically across the interior of the passageway 306 and is fixed in place by way of the solid material 302. The pin 314 is also referred to as an anchor pin for purposes herein.

The housing includes a first flexible strand 316. The flexible strand 316 can be defined by or include a steel or metallic cable, a steel or metallic chain, or another suitable constituency. The flexible strand 316 is mechanically engaged to the pin 314 and is therefore anchored to the housing 300 at one end. The flexible strand 316 extends outward from the passageway 306 by way of the opening 308. The flexible strand 316 can be of any suitable length and can terminate with, for non-limiting example, a locking mechanism, a closed loop, and so on, configured to be removably secured to a portable computer or other entity.

The housing includes a second flexible strand 318. The flexible strand 318 can be defined by or include a steel or metallic cable, a steel or metallic chain, or another suitable constituency. The flexible strand 318 is mechanically engaged to the pin 314, thus being anchored to the housing 300 at one end. The flexible strand 318 extends outward from the passageway 306 by way of the opening 310. The flexible strand 318 can be of any suitable length and can terminate, for non-limiting example, with an anchor end (e.g., 118), a locking mechanism, and so on, configured to be removably secured to a locking point, anchoring loop, table leg, and so on.

Second Illustrative Housing

Figure 4:
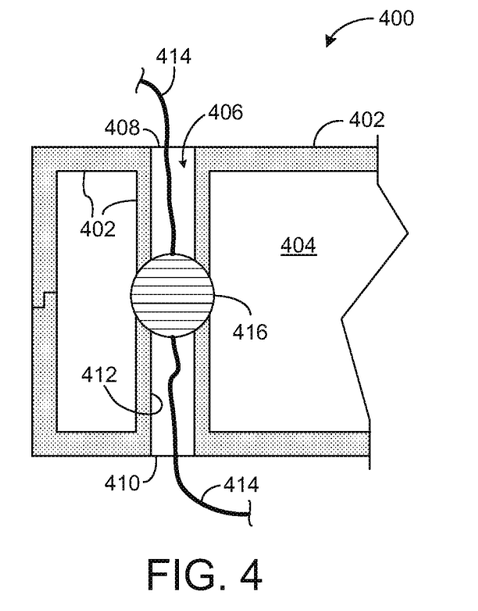
FIG. 4 depicts a sectional view of a housing according to another example.

Reference is now made to FIG. 4, which depicts a sectional view of a portion of a housing 400. The housing 400 can enclose any suitable electrical, electronic or mechanical constituency. In one example, the housing 400 includes components and circuitry defining a power supply for a portable computer. Other accessories or peripherals including the housing 400 can also be defined. The housing 400 is illustrative and non-limiting with respect to the present teachings.

The housing 400 is formed from a solid material 402 such as plastic, metal and so on such that an interior cavity 404 is defined. The housing 400 is characterized by a passageway 406 that extends from a first opening 408 to a second opening 410. The passageway 406 is characterized by an interior wall 412 formed of the solid material 402 such that a channel or conduit is defined.

The housing 400 also includes a flexible strand 414. The flexible strand 414 can be defined by or include a steel or metallic cable, a steel or metallic chain, or another suitable constituency. The flexible strand 414 is routed through the passageway 406 and extends outward there from by way of the respective openings 408 and 410. The flexible strand 414 can be of any suitable length and can include opposite terminations respectively defined by a closed loop, a locking mechanism, an anchor end, and so on.

The housing 400 includes a sphere 416. The sphere 416 can be formed from metal or another suitable material and is mechanically secured to the flexible strand 414. In one example, the sphere 416 is crimped or compressed about the flexible strand 414. The sphere 416 is also fixedly secured within the passageway 406 by way of the interior wall 412. That is, the sphere 416 is anchored to the housing 400 by way engagement with the solid material 402. In this way, the flexible strand 414 is mechanically secured to the housing 400 by way of the sphere 416.

Third Illustrative Housing

Figure 5:
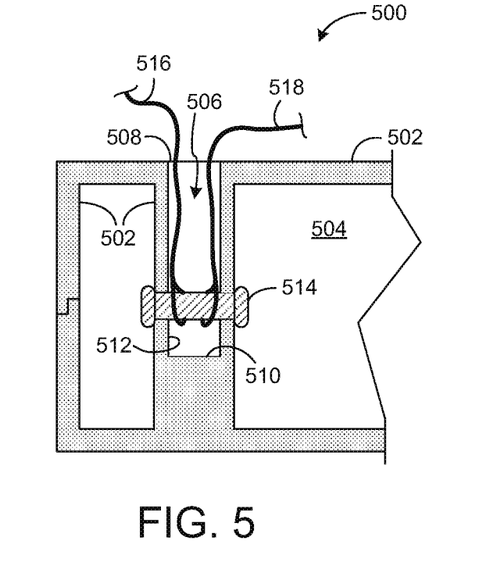
FIG. 5 depicts a sectional view of a housing according to one example.

Attention is now turned to FIG. 5, which depicts a sectional view of a portion of a housing 500. The housing 500 can enclose any suitable electrical, electronic or mechanical constituency. In one example, the housing 500 includes components and circuitry defining a power supply for a portable computer. Other accessories or peripherals including the housing 500 can also be defined. The housing 500 is illustrative and non-limiting with respect to the present teachings.

The housing 500 is formed from a solid material 502 such as plastic, metal and so on such that an interior cavity 504 is defined. The housing 500 is characterized by a passageway 506 that extends inward from an opening 508 and terminates in a bottom 510. The passageway 506 is characterized by an interior wall 512 formed of the solid material 502 such that a partial conduit or cavity is defined.

The housing 500 also includes pin 514. The pin 514 is formed from metal such as steel, or another suitable material. The pin 514 spans diametrically across the interior of the passageway 506 and is fixed in place by way of the solid material 502. The pin 514 is also referred to as an anchor pin for purposes herein.

The housing includes a first flexible strand 516. The flexible strand 516 can be defined by or include a steel or metallic cable, a steel or metallic chain, or another suitable constituency. The flexible strand 516 is mechanically engaged to the pin 514 and is therefore anchored to the housing 500 at one end. The flexible strand 516 extends outward from the passageway 506 by way of the opening 508. The flexible strand 516 can be of any suitable length and can terminate with, for non-limiting example, a locking mechanism, a closed loop, and so on, configured to be removably secured to a portable computer or other entity.

The housing includes a second flexible strand 518. The flexible strand 518 can be defined by or include a steel or metallic cable, a steel or metallic chain, or another suitable constituency. The flexible strand 518 is mechanically engaged to the pin 514, thus being anchored to the housing 500 at one end. The flexible strand 518 extends outward from the passageway 506 by way of the opening 508. The flexible strand 518 can be of any suitable length and can terminate with, for non-limiting example, an anchor end (e.g., 118), a locking mechanism, and so on, configured to be removably secured to a locking point, anchoring loop, table leg, and so on.

The housing 500 provides for respective flexible strands 516 and 518 (e.g., cable, chain, and so on) that extend outward from the passageway 506 on a common side (i.e., top side) of the housing 500, rather than top-to-bottom pass-through configuration. In this way, the housing 500 need not rest on either of the respective flexible strands 516 and 518 when being supported on a table top, desk area, or similar location.

Fourth Illustrative Housing

Figure 6:
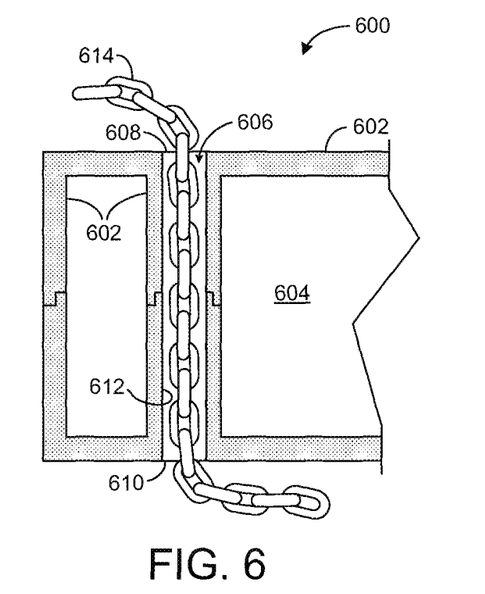
FIG. 6 depicts a sectional view of a housing according to one example.

Reference is now made to FIG. 6, which depicts a sectional view of a portion of a housing 600. The housing 600 can enclose any suitable electrical, electronic or mechanical constituency. In one example, the housing 600 includes components and circuitry defining a power supply for a portable computer. Other accessories or peripherals including the housing 600 can also be defined. The housing 600 is illustrative and non-limiting with respect to the present teachings.

The housing 600 is formed from a solid material 602 such as plastic, metal and so on such that an interior cavity 604 is defined. The housing 600 is characterized by a passageway 606 that extends from a first opening 608 to a second opening 610. The passageway 606 is characterized by an interior wall 612 formed of the solid material 602 such that a channel or conduit is defined.

The housing 600 also includes a chain 614. The chain 614 is also referred to as a flexible strand 614 for purposes herein. The chain 614 can be form from steel or another metal, or another suitable material. The chain 614 is routed through the passageway 606 and extends outward there from by way of the respective openings 608 and 610. The chain 614 can be of any suitable length and can include opposite terminations respectively defined by, for non-limiting example, a locking mechanism, a padlock, an anchor end, a closed loop, and so on.

Fifth Illustrative Housing

Figure 7:
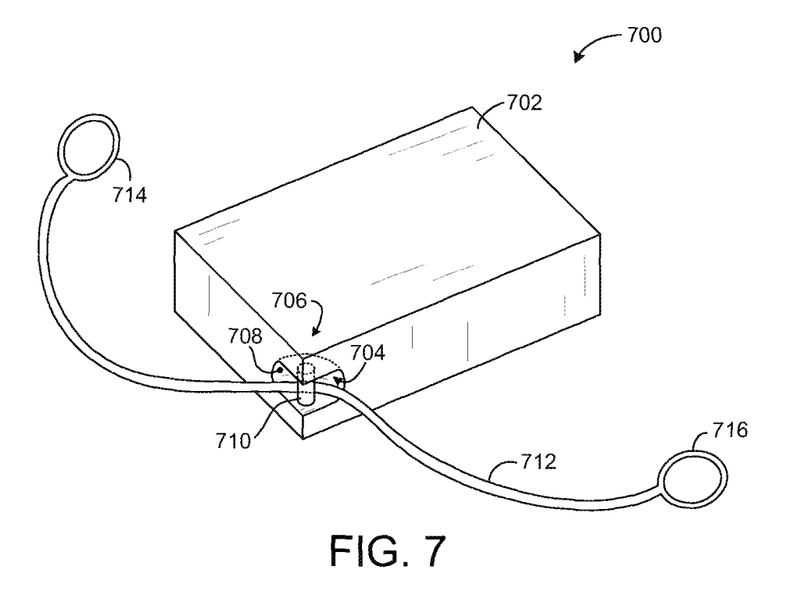
FIG. 7 depicts an isometric view of a housing according to an example of the present teachings.

Reference is now made to FIG. 7, which depicts an isometric-like view of a housing 700. The housing 700 can enclose any suitable electrical, electronic or mechanical constituency. In one example, the housing 700 includes components and circuitry defining a power supply for a portable computer. Other accessories or peripherals including the housing 700 can also be defined. The housing 700 is illustrative and non-limiting with respect to the present teachings.

The housing 700 is formed from a solid material 702 such as plastic, metal and so on such that an interior cavity is defined. The housing 700 is characterized by or defines an arcuate passageway 704 disposed at a corner-wise aspect 706 of the housing 700. The passageway 704 is defined by interior wall surface 708 such that the interior of the housing 700 remains sealed against ambient (i.e., environmental) contaminants.

The housing 700 also includes a guide pin 710 that is disposed within the passageway 704 such that the passageway 704 is defined by an elbow-like form-factor. The guide pin 710 can be form from steel, another metal or another suitable material. The guide pin 710 extends into the solid material 702 and is held fast in place.

The housing 700 also includes a flexible strand 712. The flexible strand 712 can be form from steel or another metal, or another suitable material. The flexible strand 712 is routed through the passageway 704 and is kept in place by way of the guide pin 710. The flexible strand 712 can be of any suitable length and can include opposite terminations respectively defined by, for non-limiting example, a locking mechanism, a padlock, an anchor end, a closed loop, and so on. As depicted, the flexible strand includes closed loop ends 714 and 716, respectively. Other configurations can also be used.

Illustrative Method

Figure 8:
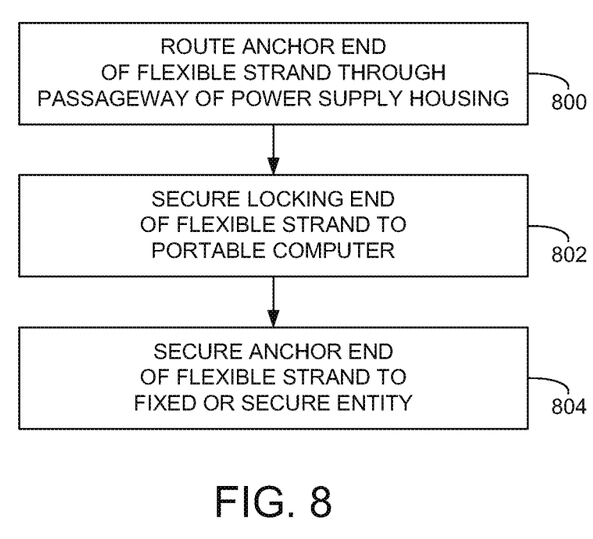
FIG. 8 depicts flow diagram of a method according to an example of the present teachings.

Reference is now made to FIG. 8, which depicts a flow diagram of a method according to another example of the present teachings. The method of FIG. 8 includes particular steps and proceeds in a particular order of execution. However, it is to be understood that other respective methods including other steps, omitting one or more of the depicted steps, or proceeding in other orders of execution can also be used. Thus, the method of FIG. 8 is illustrative and non-limiting with respect to the present teachings. Reference is also made to FIG. 1 in the interest of understanding the method of FIG. 8.

At 800, an anchor end of a flexible strand is routed through a passageway of a housing for a power supply. For purposes of an example, the anchor end 118 (i.e., a closed loop) of a flexible strand 114 is routed through a passageway 112 in a housing 110 for a power supply 104.

At 802, a locking end of the flexible strand is secured to a portable computer. For purposes of the present example, a locking end 116 is removably secured to a corresponding feature of a portable (i.e., laptop) computer 102 by way of a key-actuated locking mechanism.

At 804, the anchor end of the flexible strand is secured to a fixed or secure entity. For purposes of the present example, the anchor end 118 of the flexible strand 114 is secured to a locking or security loop 120 by way of a padlock 122. The portable computer 102 and the power supply 104 are now secured against theft by way of a single flexible strand 114. The flexible strand 114 is thereafter removable from the portable computer 102 or power supply 104 by way of corresponding operation of the locking end 116 or padlock 122.

In general and without limitation, the present teachings contemplate various housing for power supplies or other accessories and methods of their use. Such a housing includes a passageway extending partially or completely there through, and includes an anchor pin or guide pin in some embodiments. In some examples, a single flexible strand such as a metallic cable or chain can be routed there through, having a locking mechanism securable to a portable computer (or other entity) and an anchor end securable to a security ring, article of furniture, or other entity.

In some other examples, two respective flexible strands extend outward from an anchoring or mechanical engagement within a partial passageway of a housing. One of the flexible strands includes a locking mechanism that is securable to a portable computer (or other entity). The other of the flexible strands includes an anchor end that is securable to a security ring, and so on. A portable computer (or other device) and a power supply (or other accessory) can be secured against theft by way of the various devices configurations contemplated by the present teachings.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. A power supply for a portable computer, comprising:
   a locking mechanism to be removably secured to a corresponding feature of a portable computer;
   a housing characterized by a passageway extending partially there through; and
   a flexible strand having an anchor end to be removably secured to an entity, the flexible strand being mechanically secured to the housing within the passageway, and the locking mechanism is disposed at an end of another flexible strand distinct from the flexible strand having the anchor end.

2. The power supply according to claim 1, the flexible strand including either a metallic cable, or a metallic chain.

3. The power supply according to claim 1 further comprising circuitry configured to provide conditioned electrical energy to the portable computer.

4. The power supply according to claim 1, the anchor end including a closed loop.

5. A power supply, comprising:
   electrical circuitry configured to derive conditioned electrical energy from a source of electrical energy;
   cabling to provide the conditioned electrical energy to an electrical load;
   a housing about the electrical circuitry, the housing characterized by a passageway extending at least partially there through and having an interior wall surface;
   a first feature disposed at an end of a first flexible strand extending outward from the passageway and configured to be removably secured to the electrical load; and
   a second feature disposed at an end of a second flexible strand distinct from the first flexible strand extending outward from the passageway and configured to be removable secured to an entity.

6. The power supply according the claim 5, the housing defining an interior cavity that is sealed against ambient contaminants.

7. The power supply according the claim 5, the passageway extending through the housing from a first opening to a second opening.

8. The power supply according the claim 5, the housing including an anchor pin that spans diametrically across an interior of the passageway and is fixed in place.

9. The power supply according the claim 8, at least one of the first flexible strand and the second flexible strand is mechanically engaged to the anchor pin.

10. The power supply according the claim 8, both the first flexible strand and the second flexible strand are mechanically engaged to the anchor pin.

11. The power supply according the claim 5, the passage extends inward from an opening and terminates in a bottom.

* * * * *